United States Patent [19]

Holland

[11] 4,346,430
[45] Aug. 24, 1982

[54] CODED STROBE LIGHT DEVICE FOR AIRCRAFT

[76] Inventor: Bruce B. Holland, 7628 La Sobrina Dr., Dallas, Tex. 75248

[21] Appl. No.: 125,351

[22] Filed: Feb. 28, 1980

[51] Int. Cl.³ .............................................. B64D 47/02
[52] U.S. Cl. .................................. 362/62; 340/27 NA; 340/25; 362/227
[58] Field of Search .................... 362/62, 227; 116/26, 116/DIG. 43; 340/25, 27 NA, 76, 74

[56] References Cited

U.S. PATENT DOCUMENTS

| | | | |
|---|---|---|---|
| 2,273,747 | 2/1942 | Adler | 362/62 |
| 2,337,744 | 12/1943 | Garstag | 362/62 |
| 2,777,120 | 1/1957 | Madsen | 362/62 |
| 3,619,597 | 11/1971 | Adler | 340/25 |
| 3,676,736 | 7/1972 | Starer | 315/241 R |
| 3,735,115 | 5/1973 | Adler | 340/25 |
| 4,011,541 | 3/1977 | Fabry | 362/62 |

Primary Examiner—Donald P. Walsh
Attorney, Agent, or Firm—Richards, Harris & Medlock

[57] ABSTRACT

This strobe light device is intended as an aid to aircraft operators, in supporting the "See and Avoid" concept as set forth in "Federal Aviation Regulations Part 91", and it consists primarily of a cluster arrangement, which includes a power source, a timing device, colored lenses and a light separator. It further includes transparent covers and a mounting base.

15 Claims, 3 Drawing Figures

CODED STROBE LIGHT DEVICE FOR AIRCRAFT

This invention relates to strobe lights, and more particularly, to a coded strobe light device for aircraft.

It is the principal object of this invention to provide a coded strobe light device for aircraft, which will be adaptable for use as an airborne conspicuity enhancement device, that is capable of emitting high intensity light patterns.

Another object of this invention is to provide a coded strobe light device for aircraft, which will emit the aforementioned light patterns, in such a manner, as to enable any observer to determine readily the direction of travel of an aircraft equipped with the device, and, to an airborne observer (pilot or crew member of another aircraft), will serve as a means to determine readily whether an aircraft poses a threat of imminent collision.

A further object of this invention is to provide a coded strobe light device, which will serve as an aid to aircraft operators in supporting the "See and Avoid" concept, as set forth in "Federal Aviation Regulations Part 91", particularly in areas of mixed high density IFR/VFR traffic, and during periods of marginal visibility.

An even further object of this invention is to provide a coded strobe light device, which will be suitably mounted, preferably atop the vertical stabilizer, so as to obtain maximum visibility from any position.

Other objects are to provide a coded strobe light device, which is simple in design, inexpensive to manufacture, rugged in construction, easy to use, and efficient in operation.

These, and other objects, will be readily evident, upon a study of the following specification, and the accompanying drawing, wherein.

Figures 1, 2:
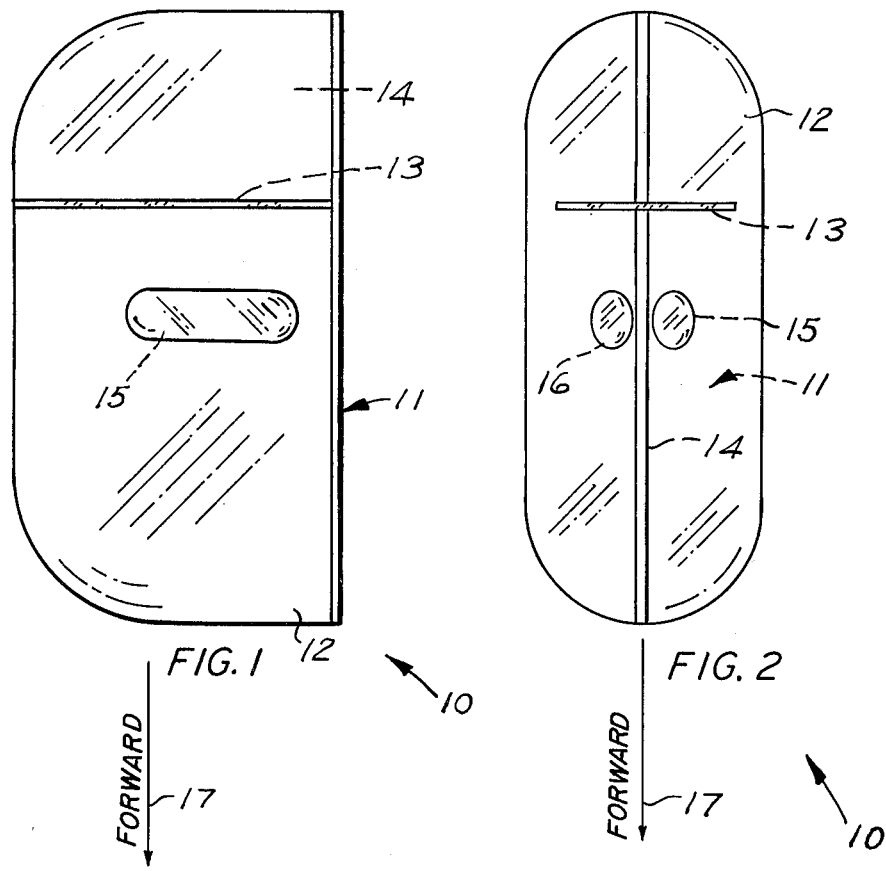
FIG. 1 is a side view of the present invention, shown in elevation.
FIG. 2 is a top plan view of FIG. 1.

According to this invention, a strobe light 10 is shown to include an oval configurated base 11, to which is secured, in a suitable manner (not shown), a transparent plastic cover 12. Secured to base 11, on the interior of light 10, is a red lens 13, which abuts with light separator members 14, and, secured on opposite sides of one of the separator members 14, are strobe elements 15 and 16. The arrows 17, shown in FIGS. 1 and 2, serve as a means of indicating the forward travel of the aircraft in flight, and light 10 is preferably mounted, by its base 11 means, to the top of the vertical stabilizer of an aircraft.

Figure 3:
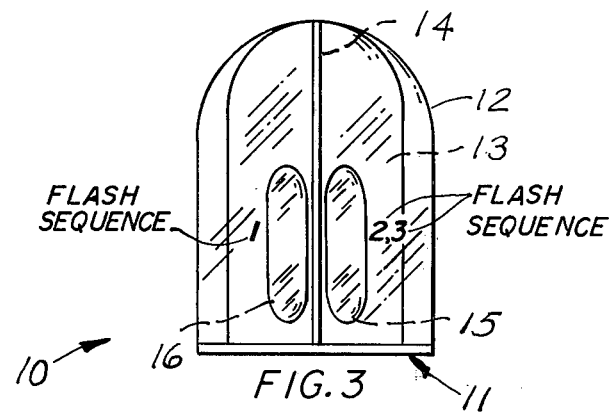
FIG. 3 is a front view of FIG. 1.

In FIG. 3 of the drawing, the numerical characters 1, 2, and 3, serves as a means of indicating the coded flash sequence of the strobe elements 15 and 16, and a power source and timing device (not shown) will be used to operate light 10.

It shall be recognized, that the aforementioned timing device and power source with circuit means are not shown, because such are common in the art, and they are so-called "off-the shelf-products".

In operation, the timing device will enable the strobe elements 15 and 16 to flash in a regulated sequence (approximately four flashes per second), which will be visible from the forward and aft positions, (within approximately ten to fifteen degrees of the longitudinal axis). By the use of the light separator members 14, only one flash each one-half second will be seen from the right side of light 10, and two flashes, one-quarter of a second apart, will be seen from the left side, on every cycle of the timing device. Placement of the light separator members 14 will also determine the arc through which all four flashes will be seen from the forward and aft positions. The structure of light 10 is such, that the colored lens 13 is in the rear of the strobe elements 15 and 16, so as to distinguish the frontal arc from the rear.

It shall also be noted, that to achieve the intended coded effect, the placement of the strobe elements 15 and 16, the lens 13, and the shape of the light separator members 14, are to be determined contingent upon choice and availability of components, manufacturing techniques, and other limitations.

While various other changes may be made in the detail construction, it is understood that such changes will be within the spirit and scope of the present invention, as is defined by the appended claims.

What I now claim is:

1. A light device for use on aircraft comprising:
   a first strobe element for flashing a signal in a first regulated sequence;
   a second strobe element for flashing a signal in a second regulated sequence;
   separator means for permitting emission of the signals of said first and second strobe elements over first and second predetermined arc about the aircraft, the first and second predetermined arcs overlapping in at least one arcuate region; and
   the combined signal of said first and second strobe elements in said at least one arcuate region being distinct from signals in either the first or second regulated sequences to indicate the direction of motion of the aircraft without relation to the distance from which the aircraft is viewed.

2. The light device according to claim 1, wherein said lens is fixedly secured, at one end, to said base, said light device further including a transparent streamlined cover secured to said base and covering said strobe elements, separator member and lens, and the opposite end of said lens extends to the top inner periphery of said transparent cover, and said separator member comprises a pair of opaque members fixedly secured, on one side, to the top of said base, and serves as light blocking means between said strobe elements.

3. The light device according to claim 2, wherein said pair of opaque members each abut with said lens, and are in alignment with each other, and each of said strobe light elements is secured, in a suitable manner, to one side of the larger one of said pair of opaque members.

4. The light device of claim 1 wherein said at least one arcuate region is oriented in the direction of travel of the aircraft to permit an observer to determine the direction of travel of the aircraft.

5. The light device of claim 1 wherein the first and second predetermined arcs overlap in first and second arcuate regions, the first arcuate region being oriented in the direction of travel of the aircraft and the second arcuate region being oriented opposite the direction of travel.

6. The light device of claim 5 further comprising means for modifying the combined signal propagated in one of the first and second arcuate regions to permit an observer to determine whether the aircraft is approaching or departing.

7. The light device of claim 1 wherein said first regulated sequence flashes a signal of two consecutive flashes at quarter second intervals followed by a half second without flash and the second regulated sequence flashes a signal at ¾ second intervals sequenced so that the combined signal in said at least one arcuate region flashes continuously at ¼ second intervals.

8. The light device of claim 1 wherein said at least one arcuate region lies between 20° and 30°.

9. A light device for use on an aircraft comprising:
a base;
a first strobe element secured to said base;
a second strobe element secured to said base;
a separator member positioned between said first and second strobe elements and blocking emission of signals from said first and second strobe elements in selected directions so that the signals overlap over a first arc in the direction of travel of the aircraft and a second arc behind the aircraft;
means to generate a first regulated sequence of signals from said first strobe element and a second regulated sequence of signals from said second strobe element, the sequences being timed so that non-simultaneous emission from said first and second strobe elements occurs providing a visually distinct combined signal in the first and second arcs than the individual signal from either stroke element to indicate the direction of motion of the aircraft without relation to the distance from which the aircraft is viewed.

10. The light device of claim 9 further comprising a lens mounted on said base to color the signal in the second arc behind the aircraft to inform an observer of the direction of flight of the aircraft.

11. The light source of claim 9 wherein the first regulated sequence of signals includes two consecutive flashes at quarter second intervals followed by a half second absence of flashes and said second regulated sequence flashes a signal at ¾ second intervals sequenced so that the combined signal in said first and second arcs flashes continuously at quarter second intervals.

12. The light device of claim 9 wherein said first and second arcs lie between 20° and 30°.

13. A light device for use on a aircraft comprising:
a base for mounting on the aircraft so that the light device is visible substantially a 360° arc about the aircraft;
a first strobe element secured to said base for flashing a signal in a first regulated sequence;
a second strobe element secured to said base for flashing a signal in a second regulated sequence;
a separator member positioned between said first and second strobe elements aligned with the direction of travel of the aircraft to block emission of signals from said first and second strobe elements in selected directions so that the signals overlap in a first arc forward of the aircraft and a second arc behind the aircraft, said first and second regulated sequences being timed so that non-simultaneous emission from said first and second strobe elements occurs; and
a lens mounted on said base to color the signals emitted in the second arc, the first and second regulated sequences combining to form a distinct combined signal in the first and second arcs to indicate to an observer the direction of motion of the aircraft independent of the distance of the aircraft from the observer.

14. The light device of claim 13 wherein said first and second arcs extend between 20° and 30°.

15. The light device of claim 13 wherein said first regulated sequence flashes a signal of two consecutive flashes at quarter second intervals followed by a half second without flashing and said second regulated sequence flashes a signal at ¾ second intervals sequenced with said first regulated sequence so that the combined signal in said first and second arcs flashes continuously at quarter second intervals.

* * * * *

UNITED STATES PATENT AND TRADEMARK OFFICE
CERTIFICATE OF CORRECTION

PATENT NO. : 4,346,430

DATED : August 24, 1982

INVENTOR(S) : BRUCE B. HOLLAND

It is certified that error appears in the above—identified patent and that said Letters Patent is hereby corrected as shown below:

Column 2, line 26 "arc" should be --arcs--.

Column 3, line 23 "stroke" should be --strobe--.

Signed and Sealed this

Twenty-sixth Day of October 1982

[SEAL]

Attest:

GERALD J. MOSSINGHOFF

Attesting Officer

Commissioner of Patents and Trademarks